US008014976B2

(12) United States Patent
Carpenter et al.

(10) Patent No.: US 8,014,976 B2
(45) Date of Patent: *Sep. 6, 2011

(54) SECURE DIGITAL FORENSICS

(75) Inventors: Todd L. Carpenter, Monroe, WA (US); William J. Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

This patent is subject to a terminal disclaimer.

(21) Appl. No.: 11/977,281

(22) Filed: Oct. 24, 2007

(65) Prior Publication Data

US 2009/0112521 A1    Apr. 30, 2009

(51) Int. Cl.
*G06F 11/30* (2006.01)
(52) U.S. Cl. .................. 702/186; 702/182; 702/183
(58) Field of Classification Search .......... 702/182–183, 702/186; 710/107; 713/164, 188; 726/22, 726/34
See application file for complete search history.

(56) References Cited

U.S. PATENT DOCUMENTS

| | | | |
|---|---|---|---|
| 5,832,207 A * | 11/1998 | Little et al. ............. | 726/36 |
| 6,785,821 B1 | 8/2004 | Teal | |
| 7,162,649 B1 | 1/2007 | Ide et al. | |
| 7,178,166 B1 | 2/2007 | Taylor et al. | |
| 7,181,560 B1 | 2/2007 | Grand et al. | |
| 7,216,367 B2 | 5/2007 | Szor | |
| 7,774,758 B2 * | 8/2010 | Nardini et al. ........... | 717/127 |
| 2004/0210797 A1 | 10/2004 | Kimelman et al. | |
| 2005/0055474 A1 | 3/2005 | Yang | |
| 2005/0081053 A1 | 4/2005 | Aston et al. | |
| 2005/0193217 A1 | 9/2005 | Case et al. | |
| 2006/0021032 A1 | 1/2006 | Challener et al. | |
| 2006/0069540 A1 | 3/2006 | Krutz | |
| 2006/0075502 A1 | 4/2006 | Edwards | |
| 2007/0083930 A1 | 4/2007 | Dumont et al. | |
| 2007/0085711 A1 | 4/2007 | Bousquet et al. | |
| 2009/0113210 A1 * | 4/2009 | Westerinen et al. ...... | 713/187 |

OTHER PUBLICATIONS

Christodorescu, et al., "Static Analysis of Executables to Detect Malicious Patterns", Proceedings of the 12th USENIX Security Symposium, Date: Aug. 4-8, 2003, pp. 169-186.
Schneier, et al., "Secure Audit Logs to Support Computer Forensics", ACM Transactions on Information and System Security, vol. 2, Issue No. 2, Date: May 1999, pp. 159-176.
Sivathanu, et al., "Ensuring Data Integrity in Storage:Techniques and Applications", Date: Nov. 11, 2005, pp. 26-36.
Written Opinion for PCT/US2008/075713 mailed Mar. 9, 2009.
International Search Report for PCT/US2008/075713 mailed Mar. 9, 2009.

* cited by examiner

*Primary Examiner* — Michael P Nghiem
*Assistant Examiner* — Elias Desta

(57) ABSTRACT

A security module is used to perform an audit of both a computer memory and the computer's processor status. The security module may assert itself as a bus master to read the computer memory without dependence on a program running on the computer. In addition, using a separate hardware path, the security module may access processor register data using a debug port. The security module may collect both memory and processor status information without the use of any of the computer resources being measured, avoiding either alteration of the data by the measurement tool or tampering with the data while being collected.

17 Claims, 4 Drawing Sheets

SECURE DIGITAL FORENSICS

BACKGROUND

Digital forensics and computer security auditing are two areas that require accurate snapshots of a computer's state. Accurate knowledge of the state of a computer, including memory contents, can be vital in tracking nefarious code, determining criminal activity, ensuring compliance to corporate policies, etc.

However, as in many other disciplines, the act of measuring can often influence the measurement. Programs running on a computer that are used measure the computer by definition change the state of the computer. It may be difficult or impossible to get an accurate snapshot of memory state, paging, execution state, etc. when a program must be loaded and active to take the measurement.

In addition, especially when trying to detect unauthorized code, such as a virus, a concern is that the measurement program itself may be compromised and any results returned may not be accurate.

Once the measurement has been made, the results must still be delivered for evaluation. While being stored or in transit, results data may be subject to attack. When the results data are large, e.g. a gigabyte or more, the problem of transport may be increased.

SUMMARY

A security module may be used to take accurate snapshots of a computer by asserting itself as a bus master and directly reading the physical memory of a computer. While asserted as a bus master, the security module may examine the computer's system memory contents without using any of the resources of the computer, including the computer's processor or the memory being measured. Because no computer system resources are used, the measurement process and related programs do not alter the state of the computer.

Additional measurements can be made using the debug port of computer's system processor, when such a debug port exists. The debug port allows the processor's internal registers to be read. Memory contents read from system memory, processor register contents read directly from the processor, or both, may then be used to achieve a snapshot of the computer with a higher degree of accuracy and with a greater degree of integrity than possible with invasive techniques.

Because the security module also has a secure cryptographic capability, the data collected can be either stored or transmitted securely using standard cryptographic techniques for authenticity and integrity.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
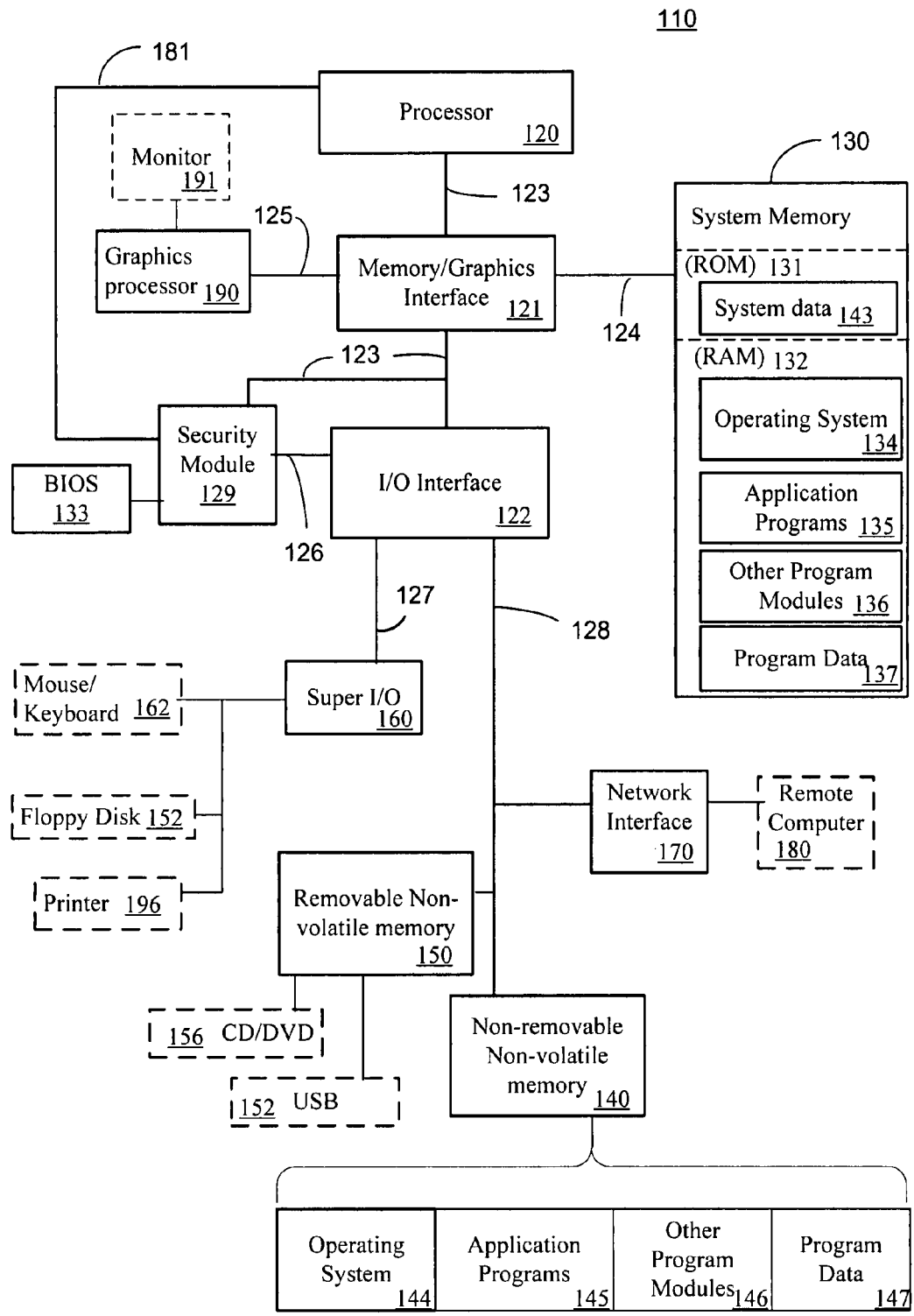
FIG. 1 is a block diagram of a computer supporting program operation and verification.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hyper Transport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

In some embodiments, a security module 129 may be incorporated to manage auditing of the state of the computer 110. The security module 129 is discussed more below, especially with respect to FIG. 2. In various embodiments the security module 129 is coupled to the I/O interface 122 via the SPI bus 126, the system bus 123, or both. In some cases, where the processor architecture allows, a connection 181 between the security module 129 and the processor 120 may allow the security module 129 to use a hardware debug/test access port (not depicted) on the processor. Hardware debug ports exist in various brands of processors and allow direct read out of internal registers in the processor. In Intel processors, the hardware debug port is called a test access port (TAP) and in AMD processors, it is called a Hardware Debug Tool (HDT) debug port. The typical use of debug ports is discussed by the various manufacturers and usually involves special headers for test pin access and special test tools for data capture. The use of such ports by the security module 129 is discussed below.

A super input/output chip 160 may be used to connect to a number of 'legacy' peripherals, such as floppy disk 152, keyboard/mouse 162, and printer 196, as examples. The super I/O chip 122 may be connected to the I/O interface 121 with a low pin count (LPC) bus, in some embodiments. The super I/O chip 121 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
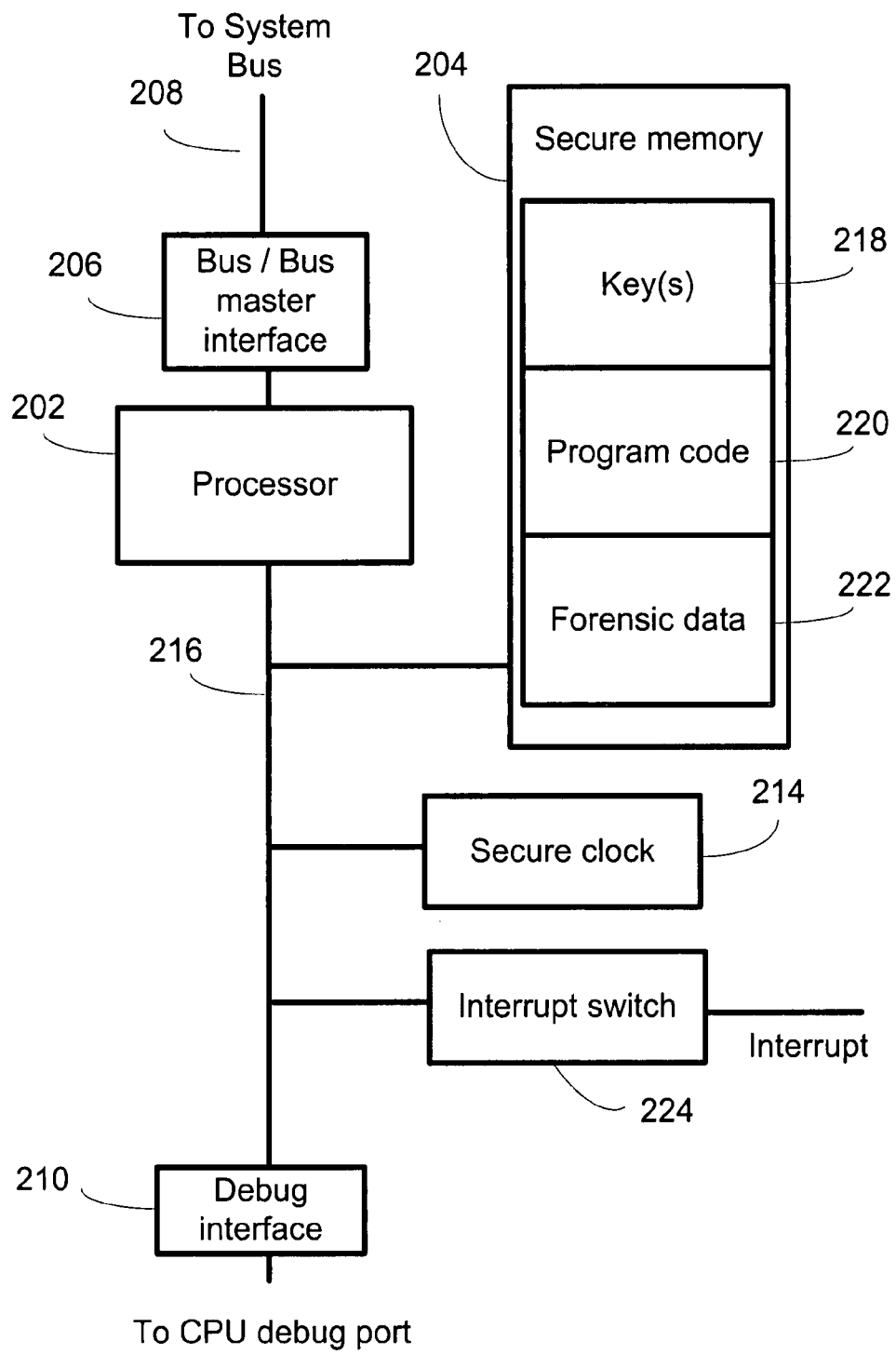
FIG. 2 is a block diagram of a security module used to perform an audit of a computer.

FIG. 2 is a block diagram illustrating a security module 200, such as the security module 129 of FIG. 1. The security module 200 may be used to audit the state of a computer. Such an audit may be used for license checking, compliance checking, or to determine unlawful activity. In the case of license checking, the audit may be used to verify what programs are running so valid licenses can be validated. For compliance checking, a computer audit may be used to determine that unauthorized programs are not executing. Auditing for unlawful activity may look for use of the computer in denial of service attacks or other network-based fraud schemes, either with or without the knowledge of a user.

The security module 200 may have a controller or processor 202 for executing programmatic commands stored in a secure memory 204. Components of the security module 200 may communicate over an internal bus 216. The processor 202 may communicate via a system bus interface 206 that may be used to support communication over a system bus 208. The system bus 208 may be similar to the system bus 123 of FIG. 1 and may be a PCI, PCIe, or similar bus. The processor 202 may, when the system processor 120 of FIG. 1 supports it, use a debug interface 210 to communicate with a processor debug port.

The secure memory 204 may store both computer-executable instructions and data. Hash algorithms as well as other cryptographic algorithms may be stored as part of program code 220. The program code 220 may also include computer-executable instructions for operation of the security module 200. Forensic data 222 may include hash data for known programs, code segments from known programs, virtual or physical memory locations for auditing, etc.

In operation, in order to read data in the computer memory 130 without the threat of interfering, or even malicious, code running on the processor 120, the security module 200 may assert itself as a system bus master via the bus interface 206. When acting as a bus master, the security module 200 may use direct access to the memory 130 and the processor 120 and other support chips may be excluded from access to the system bus 123. The processor 202 may read the audit data, for example, executable code, out of an appropriate computer memory, such as application program memory 135. The audit data may be stored, encrypted and stored, or hashed. The hash data may also be stored, or signed and stored. When the hash is calculated, the hash may be compared to known hash data stored in the forensic data 222. The security module 200 may report if a match is found, if a match was not found, or just send the raw data, depending on the nature of the audit.

The secure memory 222 may not have sufficient memory to store the audit data captured from system memory 130. To accommodate such a limitation, the audit data may be signed, encrypted, or both, and stored in a larger memory, such as on a non-removable disk 140 or a removable memory 152, both shown on FIG. 1.

An audit of memory may only be part of an audit. Reading the contents and status of the system processor 120 may also be desirable. To accomplish this, the interrupt switch 224 may activate an interrupt. A corresponding interrupt service routine may send a signal to the security module 200 to read the system processor 120. The security module 200, upon receipt of the signal, may access the system processor 120 via the debug interface 210. Processors that support a debug interface allow a direct read out of internal registers, for example, the program counter, page data, etc. This information may be added to the audit data extracted from the memory 130.

A secure clock 214 may be used to trigger audits at specified times or at specified intervals. The secure clock 214 may also be used to timestamp audit data so that the state at a particular time can be attested.

Figure 3:
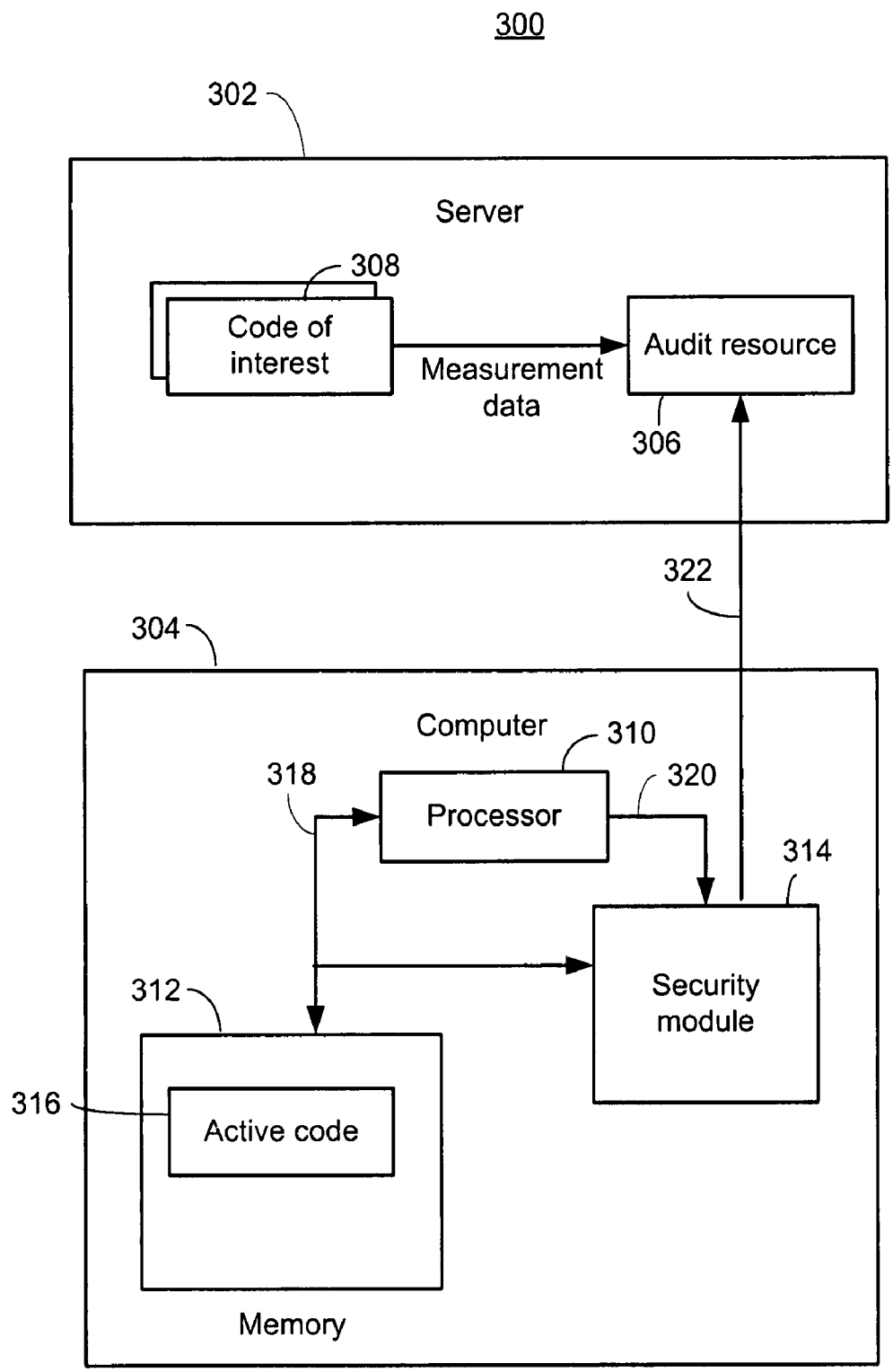
FIG. 3 is a system diagram for implementing an audit of a computer using a security module.

FIG. 3 is a block diagram of a system 300 supporting program operation and verification. The system 300 may have both a server 302 and a computer 304. The server 302 may include an audit resource 306 that may be used to perform audits of data received from the computer 304.

The computer 304 may have a processor 310, a memory 312, and a security module 314, among other components (not depicted). The memory 312 may store data and executable code, such as active code 316.

In operation, the processor 310 may execute the active code 316 over system bus 318. The security module 314 may assert control of the system bus 318 and download all or part of the memory 312, including the active code 316. In addition, the security module 314 may download the contents of processor 310 over direct link 320. The audit data, including memory data, processor contents, or both may be processed locally in the security module 314 or may be transported to the audit resource 306 over link 322. The link 322 may be a secure channel set up over an existing Internet protocol link (not depicted).

The audit resource 306 may use known code of interest 308 to develop hashes or memory segment data for comparison with the audit data received from the security module 314.

Figure 4:
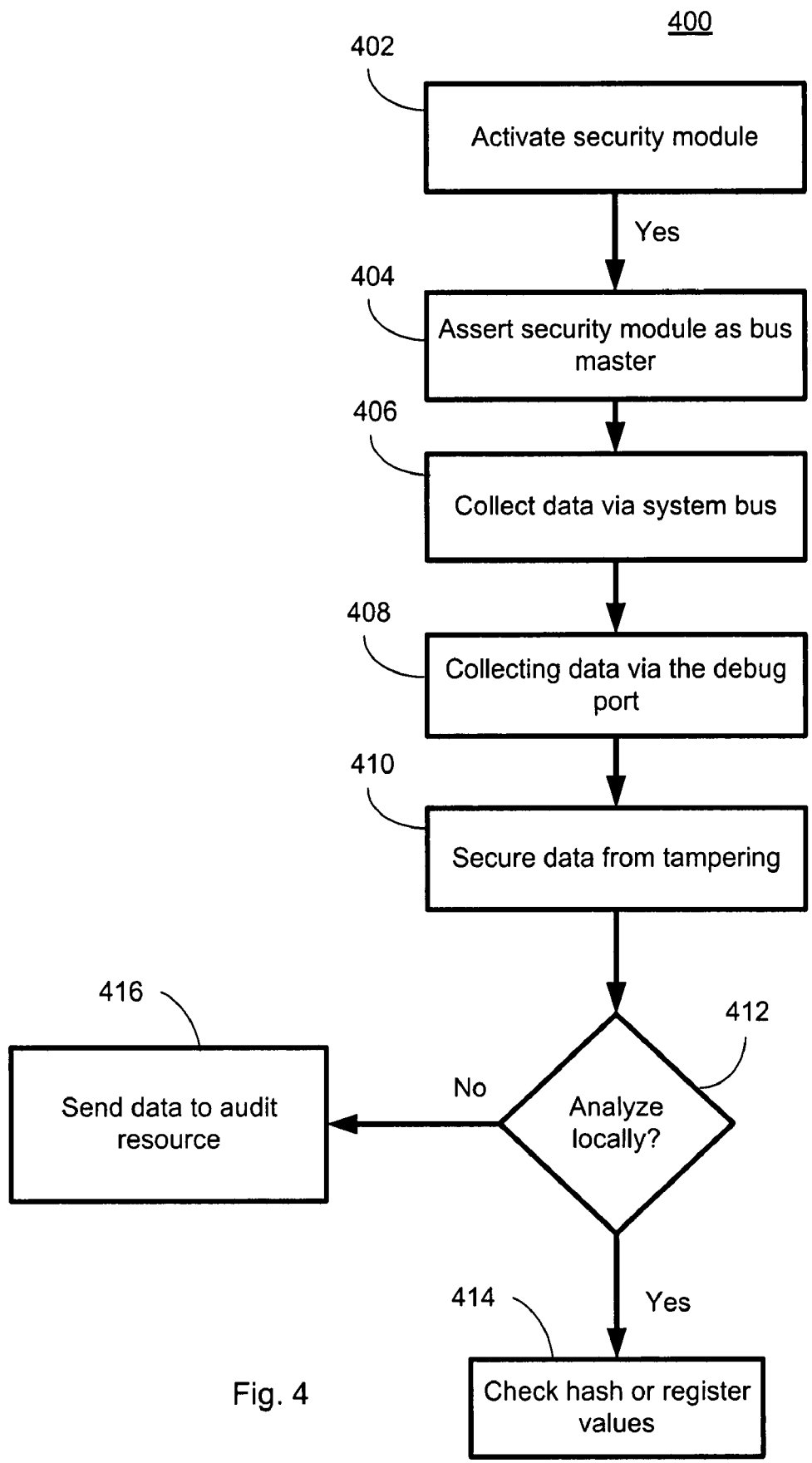
FIG. 4 is a method of performing an audit using a security module in a computer.

FIG. 4 is a method 400 of measuring the state of computer 304 using a security module 314. At block 402, the security module 314 may be activated responsive to a trigger event that begins the measurement process. The trigger may be a signal from an outside entity, such as audit resource 306, an explicit request from an operating system or other audit process running on the computer, or after an interval measured by an internal clock 214.

At block 404, the security module 314 may assert itself as a bus master on a system bus 318 used to communicated data between a processor 310 and a memory 312. While asserted as a bus master, the security module may read the memory 312 and block access by the processor 310. Because the processor 310 cannot access the memory 312, any malicious program running on the processor 310 is effectively disabled during the measurement period.

A block 406, the security module may collect data corresponding to the state of the computer via the system bus 318. The data collected may include data in some or all of the locations in memory 312. Such data may include a catalog of all users logged in, Internet protocol connection data, and memory contents corresponding to programs. A date and time measurement may be included with the collected data, using either system time information or time information from a secure clock 214 in the security module 314.

Particularly when memory for storing audit data is limited, collecting the data may also include taking a hash of the memory contents or a portion of the memory contents over a specified address.

At block 408, the security module may attach to a debug port of the processor 310 over a dedicated link 320. Using the debug port, the security module may download register data corresponding to the state of the computer 310, such as program counter, interrupt status, paging table values, etc.

At block 410, the audit data collected from the memory 312, the processor 310, or both may be secured from tampering. Securing the audit data may include creating a signature by encrypting a hash of the audit data, encrypting the audit data itself, or both. These and other cryptographic measures for protecting data are well known. When required, the secured audit data may be stored on a remote device, such as a universal serial bus (USB) removable media 152.

When the audit data is to be analyzed locally, the 'yes' branch from block 412 may be taken to block 414 and hash values or register values may be compared to forensic data 222, such as a known hash, stored in the security module 314.

When the audit data is to be analyzed remotely, the 'no' branch from block 412 may be taken to block 416. At block 416 the audit data may be sent via network 322 to a remote device, such as audit resource 306, for authentication and analysis. The analysis may include auditing authorized and unauthorized programs, viruses and other malware, users, BIOS settings, displayable data, etc.

The use of an independent security module to audit both memory and processor contents and state provides a powerful tool for establishing the true state of computer in cases ranging from simple license compliance audits to criminal and terrorism investigations. The use of a security module in government and corporate environments can be useful for civil and criminal audits. The security module may have other uses for metering and pay-per-use applications for the general public but its use for auditing may have additional benefits to users, manufacturers, and repair personnel.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer arranged and adapted for auditing comprising:
   a first processor including a first bus master interface;
   a system memory;
   a system bus coupling the first processor to the system memory; and
   a security module coupled to the system bus comprising:
      a second processor;
      a second bus master interface coupling the second processor to the system bus;
      a secure memory coupled to the second processor;
      a processor debug port interface on the security module;
      a signal connection independent of the system bus directly connecting the processor debug port interface on the security module and a processor debug port; and
      an interrupt switch that, when activated, causes the security module to read at least a program counter of the first processor.

2. The computer of claim 1, further comprising an interrupt output that, when asserted, causes the computer to call an interrupt routine.

3. A security module for use in capturing a state of operation of a computer comprising:
   a first processor;
   a bus master interface coupled to the first processor for interfacing to a system bus of the computer;
   a secure memory coupled to the first processor for storing image data captured via the bus master interface; and
   a debug port interface for directly connecting to a debug port of a system processor of the computer, wherein the first processor executes an interrupt service routine to capture processor status information responsive to an interrupt request and performs a forensic analysis of the image data and the processor status information to determine that unauthorized programs are not executing or participating in unlawful activity.

4. The security module of claim 3, wherein the secure memory further stores system processor register data captured via the debug port interface.

5. The security module of claim 3, further comprising a timer.

6. A method comprising:
   collecting memory data corresponding to a state of a computing device via a system bus of the computing device;
   activating an interrupt;
   responsive to the interrupt, sending a signal to a security module coupled to the system bus;
   responsive to the security module receiving the signal, accessing a system processor of the computing device via a signal connection between a processor debug port interface of the security module and a processor debug port of the system processor, wherein accessing the system processor is performed at least in part by a security module processor of the security module, and wherein the signal connection is independent of the system bus;
   downloading register data corresponding to the state of the computing device from the system processor to the security module via the signal connection; and
   utilizing the memory data and the register data to audit the state of the computing device.

7. The method of claim 6, wherein collecting the memory data corresponding to the state of the computing device comprises copying one or more memory locations.

8. The method of claim 6, wherein collecting the memory data corresponding to the state of the computing device comprises cataloging users logged in to the computing device.

9. The method of claim 6, wherein collecting the memory data corresponding to the state of the computing device comprises collecting Internet protocol connection information.

10. The method of claim 6, wherein collecting the memory data corresponding to the state of the computing device comprises associating a time of day measurement with the memory data.

11. The method of claim 6, wherein collecting the memory data corresponding to the state of the computing device comprises taking a hash of a memory range.

12. The method of claim 6, wherein utilizing the memory data and the register data to audit the state of the computing device comprises analyzing the memory data and the register data by comparing the memory data and the register data to forensic data.

13. The method of claim 12, wherein analyzing the memory data and the register data comprises sending the memory data and the register data to a forensics server for analysis.

14. The method of claim 12, wherein analyzing the memory data and the register data comprises comparing a hash of a memory range with a known hash.

15. The method of claim 6, further comprising securing the memory data from tampering by encrypting the memory data.

16. The method of claim 15, wherein securing the memory data from tampering further comprises storing the encrypted memory data on removable media.

17. The method of claim 15, wherein securing the memory data from tampering further comprises sending the encrypted memory data to a remote device.

* * * * *